US012617094B2

(12) United States Patent
Hu et al.

(10) Patent No.: US 12,617,094 B2
(45) Date of Patent: May 5, 2026

(54) TEACH PENDANT CHANGE POSITION TOUCHUP VISUALIZATION

(71) Applicant: FANUC AMERICA CORPORATION, Rochester Hills, MI (US)

(72) Inventors: Xin Hu, Ann Arbor, MI (US); Yi Sun, Bloomfield Hills, MI (US); Claude Dinsmoor, Rochester Hills, MI (US); Michael Eckert, Perry, MI (US); Sean Lennon, Davisburg, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 112 days.

(21) Appl. No.: 18/604,589

(22) Filed: Mar. 14, 2024

(65) Prior Publication Data

US 2025/0289133 A1 Sep. 18, 2025

(51) Int. Cl.
B25J 9/16 (2006.01)
B25J 13/00 (2006.01)
B25J 19/06 (2006.01)

(52) U.S. Cl.
CPC ........... B25J 9/1674 (2013.01); B25J 9/1664 (2013.01); B25J 13/006 (2013.01); B25J 19/06 (2013.01)

(58) Field of Classification Search
CPC ...... B25J 9/1674; B25J 9/1664; B25J 13/006; B25J 19/06; B25J 9/0084; B25J 9/1628; B25J 9/163; B25J 9/1653; G05B 2219/39021; G05B 2219/23327; G05B 2219/23328; G05B 2219/23329; G05B 2219/36046; G05B 2219/36087; G05B 2219/42132; G05B 2219/40457; G05B 2219/41036
See application file for complete search history.

(56) References Cited

U.S. PATENT DOCUMENTS

| | | | | |
|---|---|---|---|---|
| 9,186,795 B1 * | 11/2015 | Edsinger | .............. | B25J 11/0065 |
| 10,135,848 B2 | 11/2018 | Muddu et al. | | |
| 2015/0239123 A1 * | 8/2015 | Hagenauer | .............. | B25J 9/1664 |
| | | | | 700/250 |
| 2016/0263744 A1 * | 9/2016 | Dzierzega | .............. | B25J 9/1664 |
| 2024/0326178 A1 * | 10/2024 | Aas | ......................... | B25J 9/0081 |

* cited by examiner

*Primary Examiner* — Esvinder Singh
(74) *Attorney, Agent, or Firm* — Shumaker, Loop & Kendrick LLP; John A. Miller

(57) ABSTRACT

A method and system for analyzing data describing touchups to a robot's tool center point position. A robot operator performs the touchups to a robot's tool center point position when the operator notices inaccuracies in the location of operations performed by the robot—such as a spot weld in a wrong location on a workpiece—where the inaccuracies may be caused by mechanical wear in robot joints. Each operator-defined touchup changes the position and optionally orientation of a particular point in the robot's motion program. The disclosed method provides a graphical display of the history of position touchups for the robot, and analyzes the touchup data against certain criteria for the distance, direction and frequency of the touchups. When the analysis determines that any individual or combination of criteria are met, an alert is provided which indicates a possible mechanical wear issue exists with the robot and needs attention.

21 Claims, 7 Drawing Sheets

Alert Case 2: Multiple Points, Same Direction

Robot: R99abc

Program: AA456XYZ

Points: P[5], P[6], P[7]

702

Collect
Tool Center Point
Position Touchup
Data per Robot

704

Display Touchup
Data per Robot
Upon Operator
Request

706

Analyze Touchup
Data per Robot
w/r/t Predefined
Criteria

708

Alert
Criteria Met
?

N

710

Y

Send Alert When
Indicated by
Analysis

TEACH PENDANT CHANGE POSITION TOUCHUP VISUALIZATION

BACKGROUND

Field

The present disclosure relates generally to the field of industrial robot operational diagnosis and, more particularly, to a method and system for analyzing data defining operator-performed touchups to tool center point position, providing a graphical display of the position touchups, and providing an alert to the operator when the distance, direction and/or frequency of touchups on a particular robot meet criteria which indicate a possible maintenance issue with the robot.

Discussion of the Related Art

The use of industrial robots to perform a wide range of manufacturing, assembly and material movement operations is well known. Many of these operations and tasks are performed by articulated robots, such as five- or six-axis robots with a servo motor at each rotational joint. Control of such robots is provided in real time, where an end tool motion program is divided into small increments of motion, and a robot controller performs the real-time feedback control calculations to compute joint motor input commands which move the robot end tool according to the prescribed motion program.

Kinematic and inverse kinematic (IK) calculations are used to accurately determine the position of a tool center point (TCP) in a workcell coordinate frame based on joint angular positions, and vice versa. However, over time, wear may occur in the robot, such as in joint bearings, creating mechanical looseness which causes the tool center point position to be different than that predicted by the kinematic calculations, depending on load conditions in the robot. When this occurs, a robot operator will notice that certain operations (such as a spot weld) are not being performed at the proper spatial location (such as a point on a workpiece).

When a discrepancy in the spatial location of an operation is detected, the operator has the ability to perform a "touchup" to one or more points in the motion program for a particular robot. For example, a touchup may be defined which adjusts the location of a certain point in the motion program by operator-defined distances in the X, Y and Z directions. Adjustments may also be made to yaw, pitch and roll angles of the tool. Several robots may be performing the same operation on the same type of workpiece, using the same motion program. However, because the wear conditions are robot-specific, the operator-defined touchups to tool center point position are also unique to each robot.

As wear conditions in the joint(s) of a robot continue to get worse, the need for tool center point touchups may grow more frequent, and/or the magnitude of the touchups may grow larger. Multiple touchups may also be performed which each move the tool center point position incrementally further in the same direction. However, an operator may not recognize these trends, because the operator is responsible for many robots, and certainly cannot be expected to remember and detect particular trends among touchups on each individual robot. Furthermore, until now, there has been no automated way of visualizing and analyzing tool center point touchup data to determine if a deterioration trend has developed.

In light of the circumstances described above, there is a need for an improved method of analyzing tool center point position touchup data to determine if maintenance or other action is necessary.

SUMMARY

The present disclosure describes a method and system for analyzing data describing touchups to a robot's tool center point position. A robot operator may perform the touchups to a robot's tool center point position when the operator notices inaccuracies in the location of operations performed by the robot—such as a spot weld in a wrong location on a workpiece, or a gripper attempting to grasp a workpiece at a wrong location—where the inaccuracies may be caused by mechanical wear in robot joints. Each operator-defined touchup changes the position and orientation of a particular point in the robot's motion program. The disclosed method provides a graphical display of the history of position touchups for the robot, and analyzes the touchup data against certain criteria for the distance, direction and frequency of the touchups. When the analysis determines that any individual or combination of criteria are met, an alert is provided which indicates a possible mechanical wear issue exists with the robot and needs attention.

Additional features of the presently disclosed systems and methods will become apparent from the following description and appended claims, taken in conjunction with the accompanying drawings.

DETAILED DESCRIPTION OF THE EMBODIMENTS

The following discussion of the embodiments of the disclosure directed to robot position touchup data visualization and analysis is merely exemplary in nature, and is in no way intended to limit the disclosed devices and techniques or their applications or uses.

Industrial robots are used for a variety of manufacturing, assembly and material movement operations. Although robots can be operated in a manual control mode, it is common for robots to be provided with a predefined motion program which controls the robot's movements. For example, a spot welding robot would have a motion program which defines several sequential locations on a workpiece where a spot weld is to be performed. A pick-and-place robot would have a motion program which defines a first location and orientation where a workpiece is to be grasped and a second location and orientation where the workpiece is to be placed. These are very basic examples, and many other types of robotic operations are known in the art.

Like any other machine, industrial robots are subject to wear and tear over the course of their service life. Some types of wear conditions can create inaccuracies in the robot's movement of its tool through the prescribed motion program. This situation is the subject of the present disclosure.

Figure 1:
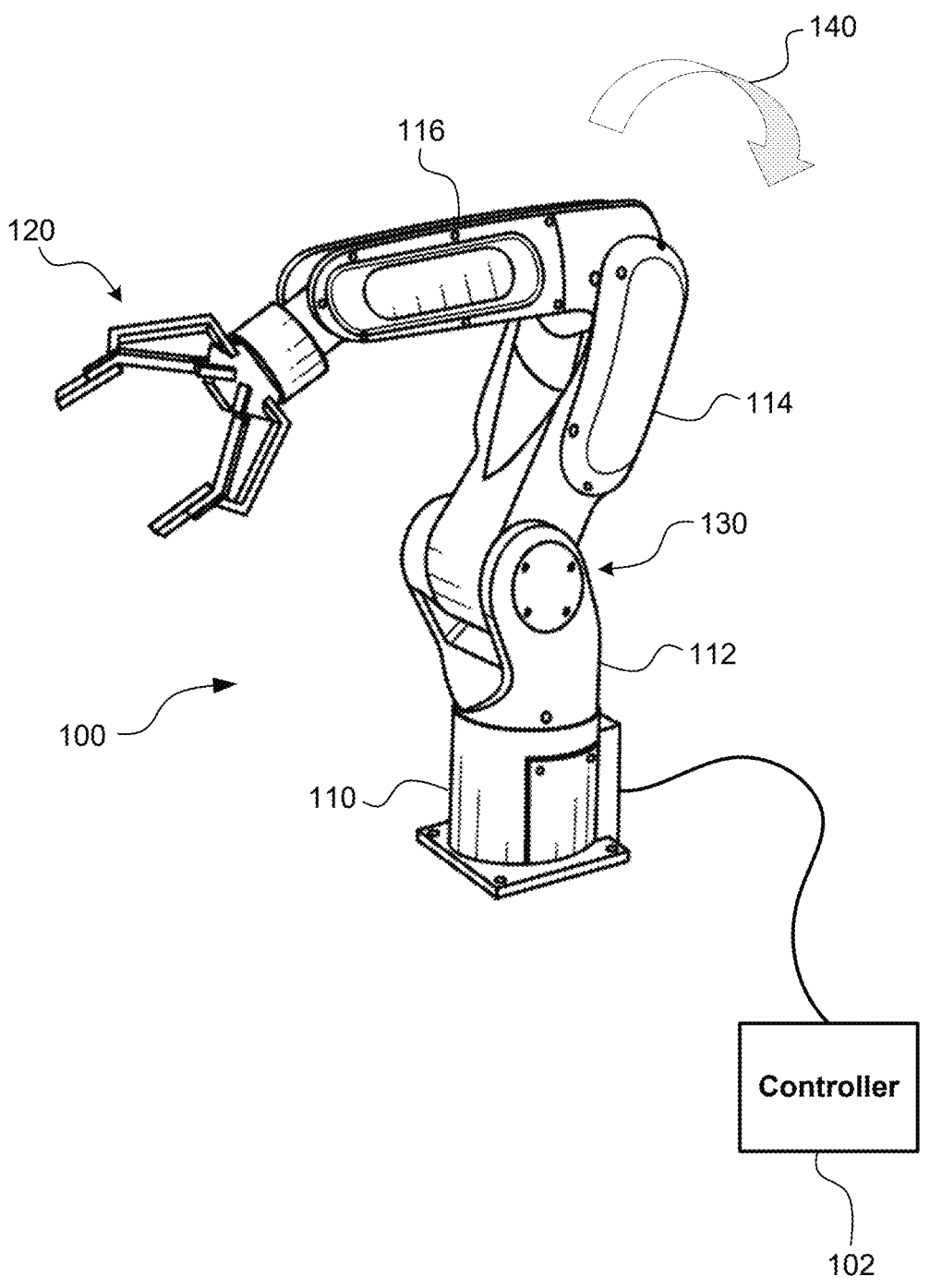
FIG. 1 is an illustration of an industrial robot depicting how a joint bearing experiencing mechanical wear can cause a robot tilt which leads to positional inaccuracies in a robot tool.

FIG. 1 is an illustration of an industrial robot 100 depicting how a joint bearing experiencing mechanical wear can cause a robot tilt which leads to positional inaccuracies in a robot tool. The robot 100 is controlled by a controller 102 to perform a task described by a motion program, as discussed above and as known in the art. The robot 100 is an articulated robot comprised of a base 110, an "arm" 112, an arm 114, an arm 116 and a tool 120, among other parts. In the robot 100, each robot arm is connected to an adjacent arm by a rotational joint, where motion in each joint is controlled by a joint motor, and each joint's actual angular position is measured by an encoder which provides a signal back to the controller 102. The controller 102 sends joint motion commands to the joint motors, causing the robot 100 to move the tool 120 through the prescribed motion program.

A joint 130 couples the arm 112 to the arm 114, and is used as an example for the current discussion. The joint 130 would typically include a support bearing in addition to the joint motor and position encoder described above. The support bearing is designed to permit rotational motion of the arm 114 with respect to the arm 112 about the axis of the joint 130, while preventing other rotational or translational motions at the joint 130. Some joints in the robot 130 may have more than one support bearing, and each joint may have a different type of joint design, depending on how much load must be handled and other factors. The important point is that, regardless of the joint and bearing design details, mechanical wear which results in joint/bearing looseness can cause superfluous and undesirable motion in robot joints. For example, looseness in the support bearing of the joint 130 can cause tilting of the arm 114 (and all other downstream arm parts) relative to the arm 112 and the base 110. This tilting, depicted by arrow 140, affects the spatial position of the tool 120. Other robot designs, numbers of arms/joint, etc., are of course equally applicable to this discussion.

When wear and looseness in the robot 100 become significant enough to allow tilting movement in one or more joints, the robot operator may notice that operations at some points in the motion program are not being performed at precisely the correct spatial location. For example, a spot weld at a certain point on a workpiece may be slightly offset from the desired target location; or a robot gripper (as illustrated for the tool 120 in FIG. 1) may attempt to grasp a workpiece at a position which is slightly offset or askew from the optimal grasp location. When the robot operator notices that a robot is consistently missing a point in the motion program, the operator can perform a change position ("touchup") operation on the robot to adjust the location and/or orientation of the tool center point. The touchup instructs the robot to use the adjusted location for the point, not the original location as defined in the motion program.

Figure 2:
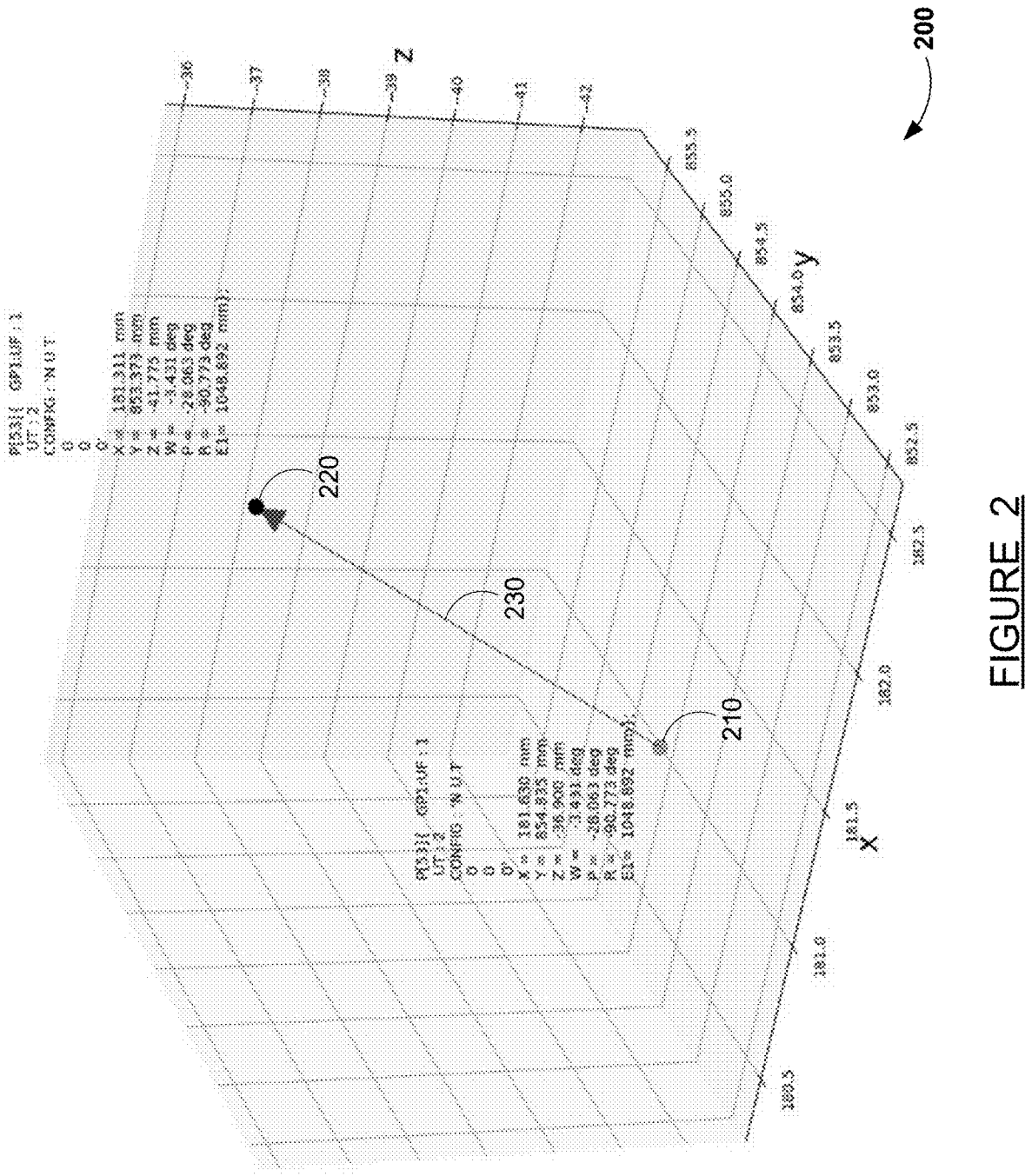
FIG. 2 is a three dimensional graph which illustrates a robot tool center point position touchup as performed by a robot operator, according to an embodiment of the present disclosure.

FIG. 2 is a three dimensional graph 200 which illustrates a robot tool center point position touchup as performed by a robot operator, according to an embodiment of the present disclosure. A point 210 defines a current position and orientation of a certain point "P[53]" in the motion program, and a point 220 defines the position and orientation of the point P[53] as adjusted by the touchup operation. The touchup illustrated in FIG. 2 (from the point 210 to the point 220) changes only the 3D position (x/y/z coordinates) of the point P[53], as depicted by a vector 230. The yaw/pitch/roll angles are not changed in the touchup of FIG. 2, although these orientation angles may be changed in a touchup operation in general. The graph 200 depicts the locations of the points 210 and 220 in 3D space, with data defining each point, including at least the x/y/z coordinates and the yaw/pitch/roll angles. The actual text and numerical values shown on the graph 200 are not significant. For discussion purposes, a typical touchup might change each of the x, y and z positions by a small amount (such as a few millimeters, or less), and leave the yaw, pitch and roll angles unchanged. The operator can perform the touchup by using a teach pendant to manually "jog" the robot tool center point from the current location (the point 210) to the adjusted location (the point 220).

In addition to illustrating the concept of a touchup, the graph 200 also shows how touchups are displayed to an operator after the fact. This is discussed further below.

Touchups as illustrated in FIG. 2 can be defined for a single point or multiple points in a robot's motion program. Touchups for an individual point in the motion program can be defined again and again, with each successive touchup further adjusting the tool center point location from its previously adjusted position. Thus, the point 210 (current location) may be the original location of the point P[53] as defined in the motion program, or the point 210 may be a location of the point P[53] as adjusted by a previous touchup.

In a typical factory, several robots of the same type may use the same motion program to perform the same operation on their respective workpieces. Because the wear (illustrated in FIG. 1) is unique to each individual robot, the operator will make touchups to each robot individually on an as-needed basis, in the amounts and directions necessary to keep the robot operation within specification. Until now, there has not been an effective technique for operators to keep track of the touchups that have been made, nor for determining what conclusions, if any, can be drawn from the totality of the touchups for a particular robot. This problem is addressed by the techniques of the present disclosure.

Figure 3:
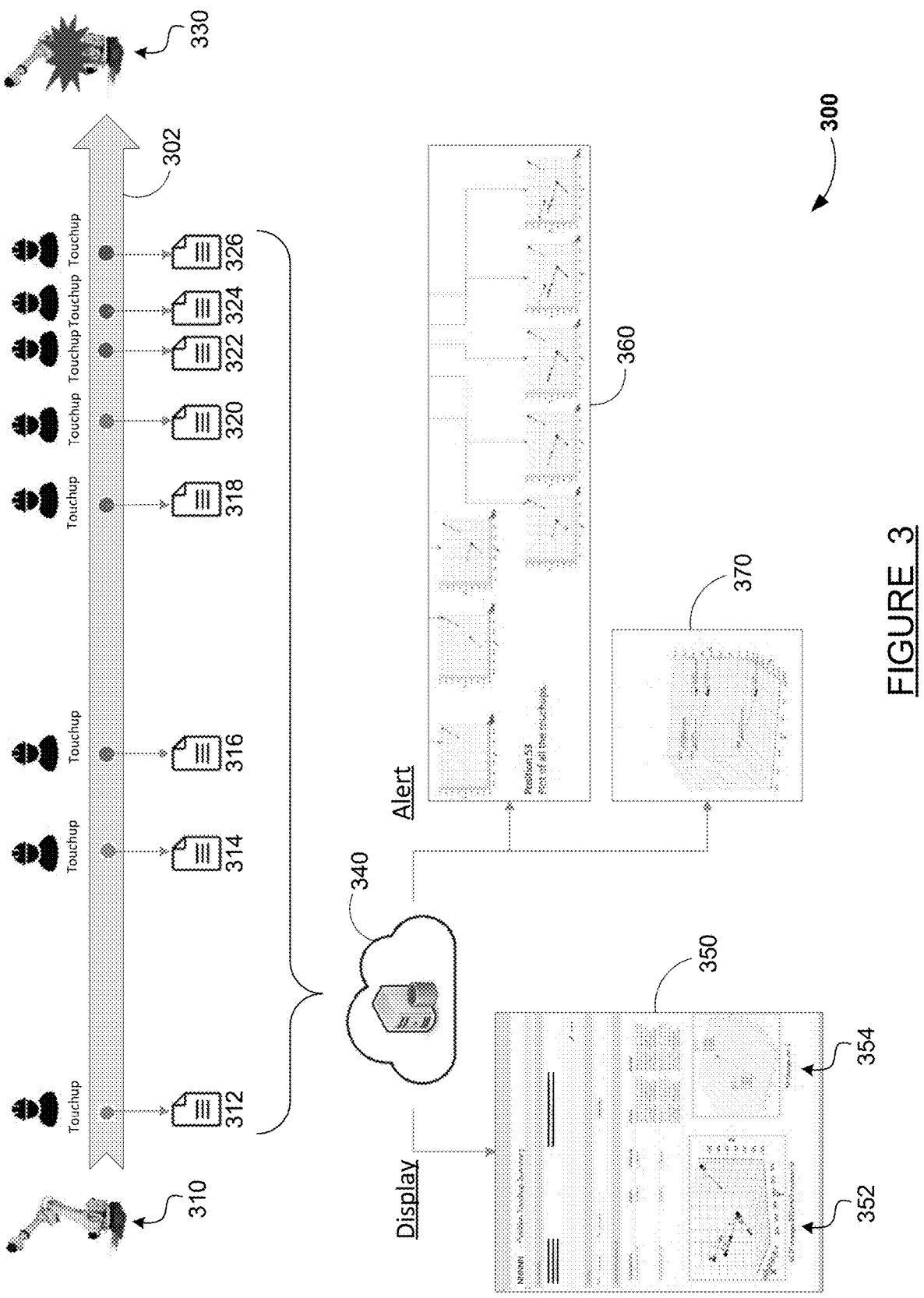
FIG. 3 is a conceptual illustration of the features and functions of the disclosed method and system for robot position touchup data visualization and analysis, according to embodiments of the present disclosure.

FIG. 3 is a conceptual illustration 300 of the features and functions of the disclosed method and system for robot position touchup data visualization and analysis, according to embodiments of the present disclosure. Along the top of FIG. 3 is a timeline 302 of touchups made to the position of a point in the motion program of a robot. At 310, the robot is operating normally, such as after the robot is initially placed in service. Tool center point position touchups are indicated at 312, 314, 316, 318, 320, 322, 324 and 326 on the timeline 312. At 330, the robot operation is no longer reliable, as the robot has had many touchups performed and continues to drift out of specification. The touchups 312-326 are used to illustrate the features of the presently disclosed methods and system according to the discussion below.

In one preferred embodiment, all of the touchup data is ultimately collected in a centralized database, which may be on-site with the robots or remote. A remote data collection device is indicated in FIG. 3 by a cloud server 340. The data collection architecture may be of any suitable design. In one example, individual robots in a facility (which may be of many different types, performing many different operations) each communicate with their own robot controller, and the robot controllers all communicate with a site data collection device. The site data collection devices for all of a company's facilities then send their data to the cloud server 340. The analysis of the touchup data may be performed by the individual robot controllers, by the site data collection device, or by the cloud server 340.

A first feature of the present disclosure is a graphical display of one or more touchups. Box 350 is a simulated display screen including two different types of touchup displays. A graph 352 depicts all touchups for a particular point in a motion program of a robot, showing that many touchups have been made in many different directions. A graph 354 depicts a particular one of the touchups from the graph 352, where details of the touchup can be examined. The robot operator can request touchup displays for any point or points in a motion program for any robot, using a display device communicating with the site data collection device or the cloud server 340 for example. The display feature enables the operator to quickly visualize and understand the touchup history of a particular robot in a way that is much more intuitive than a simple tabular listing of the touchup data. The graphs 352 and 354 are merely included to convey the conceptual idea of the graphical display feature; the points and text on these graphs are not intended to be readable in FIG. 3. The display feature is discussed further below.

A second feature of the present disclosure is automated analysis of all touchup data to determine if a robot has a wear condition needing attention. As discussed above with respect to FIG. 1, mechanical wear and looseness in robot joints can lead to inaccuracies in robot tool center point position during a motion program. Operators then perform touchups in order to re-establish the desired accuracy of the motion program points. Analysis of the touchup data can detect position touchup trends which are indicative of compensation for the joint wear and looseness.

Robot joint wear can be detected in the touchup data in several ways—including in the frequency of touchups, in the number of points in the motion program requiring touchups, and in the distance and direction of each individual touchup—along with combinations of these factors. All of the touchup data analysis is performed on an individual robot basis. FIG. 3 illustrates two different types of touchup data analysis which can trigger an alert indicating that the robot needs attention.

Box 360 depicts an analysis of robot touchup data which determines that touchup frequency criteria have been exceeded, thus resulting in an alert to the robot operator. Box 370 depicts an analysis of robot touchup data which determines that a criteria for multiple points needing touchup in the same direction has been exceeded, thus resulting in an alert to the robot operator. The graphs 352 and 354 are merely included to convey the conceptual idea of the graphical display feature; the points and text on these graphs are not intended to be readable in FIG. 3. These analyses and others are discussed further below.

Figure 4:
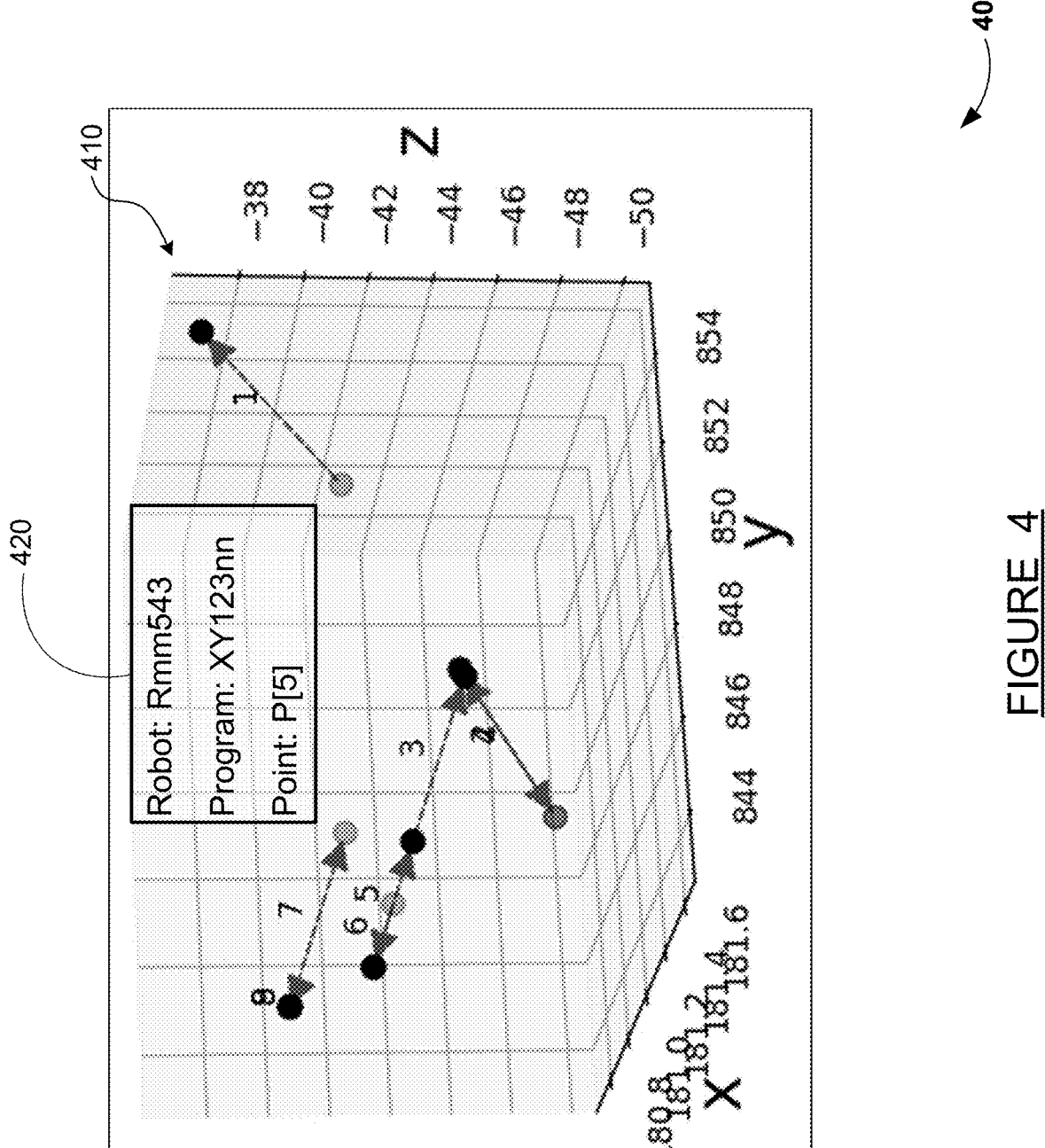
FIG. 4 is a simulated display of the robot position touchup data visualization feature, where a three dimensional graph illustrates multiple touchups performed on the same point of a robot motion program, according to an embodiment of the present disclosure.

FIG. 4 is a simulated display 400 of the robot position touchup data visualization feature, where a three dimensional (3D) graph 410 illustrates multiple touchups performed on the same point of a robot motion program, according to an embodiment of the present disclosure. The display 400 is provided on a display device available to the robot operator, such as a display device communicating with the site data collection device. Alternatively, the display 400 may be provided on any display device in communication with the cloud server 340, in which case touchup data for any robot at any facility can be viewed. The display 400 may also be provided on a display device connected to an individual robot controller.

Touchup data visualization is typically performed on an individual robot basis. For a particular robot, any combination of one or more touchups on one or more points in the motion program may be viewed. For example, the graph 410 in FIG. 4 depicts all of the touchups to a particular point ("P[5]") in the motion program of a robot, with each touchup depicted by a vector from the "current" (starting) position to the adjusted (final) position. Another example would be a display of a latest touchup made to each of a plurality of points in a motion program; this example is depicted in a later figure. Yet another example is a combination of a timeline with a graphical display of touchups to a point, with a means of correlating the events on the timeline with the touchup vectors in the 3D graph (e.g., color coding or numerical reference).

The 3D graph 410 has x, y and z axes displaying coordinate values in a "world" coordinate frame, or coordinate frame of the workcell in which the robot operates. Each touchup vector is numbered in sequential order (1, 2, etc.), so that the robot operator can understand the spatial relationships and temporal trends in the touchups. When touchup data for multiple points in the motion program are displayed, the identity of each point is displayed next to its touchup vector. Numerical data defining each touchup (such as x/y/z and yaw/pitch/roll values for both starting and final positions) may be turned on or off in the display 400. A legend 420 is provided on the graph 410, listing information such as the identity of the robot and the identity of the point(s) depicted in the touchup data.

The display of the 3D graph 410 may be manipulated by the operator in order to best visualize the touchup data-including zoom and pan of the display, and also 3D rotation of the display as needed to best depict 3D geometric relationships between the touchups.

Figure 5:
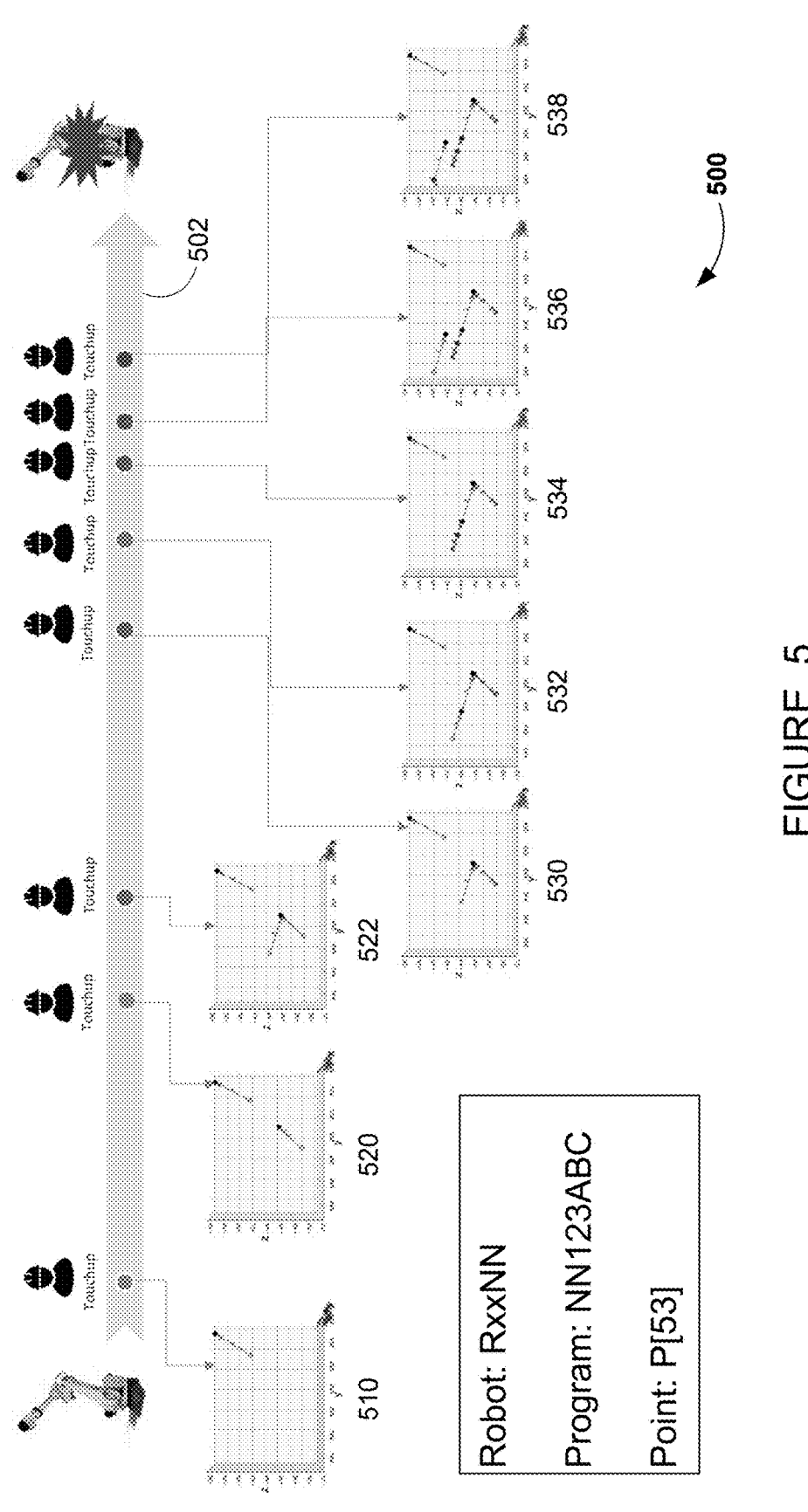
FIG. 5 is a conceptual illustration of the robot position touchup data analysis feature, where an alert is triggered by multiple touchups performed on the same point of a robot motion program with increasing frequency, according to an embodiment of the present disclosure.

FIG. 5 is a conceptual illustration 500 of the robot position touchup data analysis feature, where an alert is triggered by multiple touchups performed on the same point of a robot motion program with increasing frequency, according to an embodiment of the present disclosure. One characteristic of touchups related to mechanical wear and looseness in robots is that the wear tends to cause increasing amounts of inaccuracy in tool center point position over time. This characteristic is readily detectable by analysis of the position touchup data. FIG. 5 includes a timeline 502 which is used to illustrate a scenario where multiple touchups are made to a robot's tool center point position over time. A touchup 510 is performed shortly after the robot is placed in service. The touchup 510 may be a minor adjustment to properly calibrate the robot's operations to the robot physical setup and the fixtures used in the workcell, for example. After some time, touchups 520 and 522 are applied to the robot, possibly to adjust for some mechanical wear which is just beginning to develop. The touchup 520 is added to the graph containing the touchup 510, and the touchup 522 is graphed along with the touchups 510 and 520, and so forth.

The robot then operates without any additional touchups for another period of time. At the right of the timeline 502, a series of touchups 530-538 are performed in rapid succession relative to the overall operational life of the robot. The frequency of the touchups 530-538 is likely an indication that mechanical wear conditions in the robot are deteriorating, and that the robot should be inspected to determine if preventive maintenance is required. An algorithm for triggering an alert based on touchup frequency may include several different calculations and criteria. The example shown in FIG. 5 has a sequence of several touchups to a single point in the motion program. This alert could be triggered by detecting two or more touchups of the same point which are separated by a time interval less than a prescribed value. The alert of FIG. 5 could also be triggered by detecting several touchups (e.g., 3-4) with an average time interval less than a prescribed value. Other similar calculations may also be used for this type of frequency-based alert, including frequency-based calculations which consider touchups to multiple points on a particular robot, not just frequency of touchups to a single individual point.

When the algorithm detects that alert criteria have been met (such as frequency of touchups), an alert is triggered. The alert indicates which robot is affected, along with information about the touchups which triggered the alert. The alert is preferably sent at least to the operator responsible for the affected robot (such as by sending a pop-up message to a display device connected to the site data collection device), and/or by displaying a message or audio or visual indicator on the affected robot's controller. The alert may also be sent to other recipients—such as a quality or manufacturing department of the company which operates the robot, a maintenance department, etc.

The timeline 502 is displayed on FIG. 5 simply for illustration purposes. It is to be understood that the analysis of the touchup data is performed automatically, such as by an algorithm running on the site data collection device or the cloud server. However, the alert which is triggered by the analysis may automatically provide a graphical display of the touchup data for visualization by the operator, in the format displayed in FIG. 5 (with the timeline 502) or one of the formats discussed previously with respect to FIG. 4.

Figure 6:
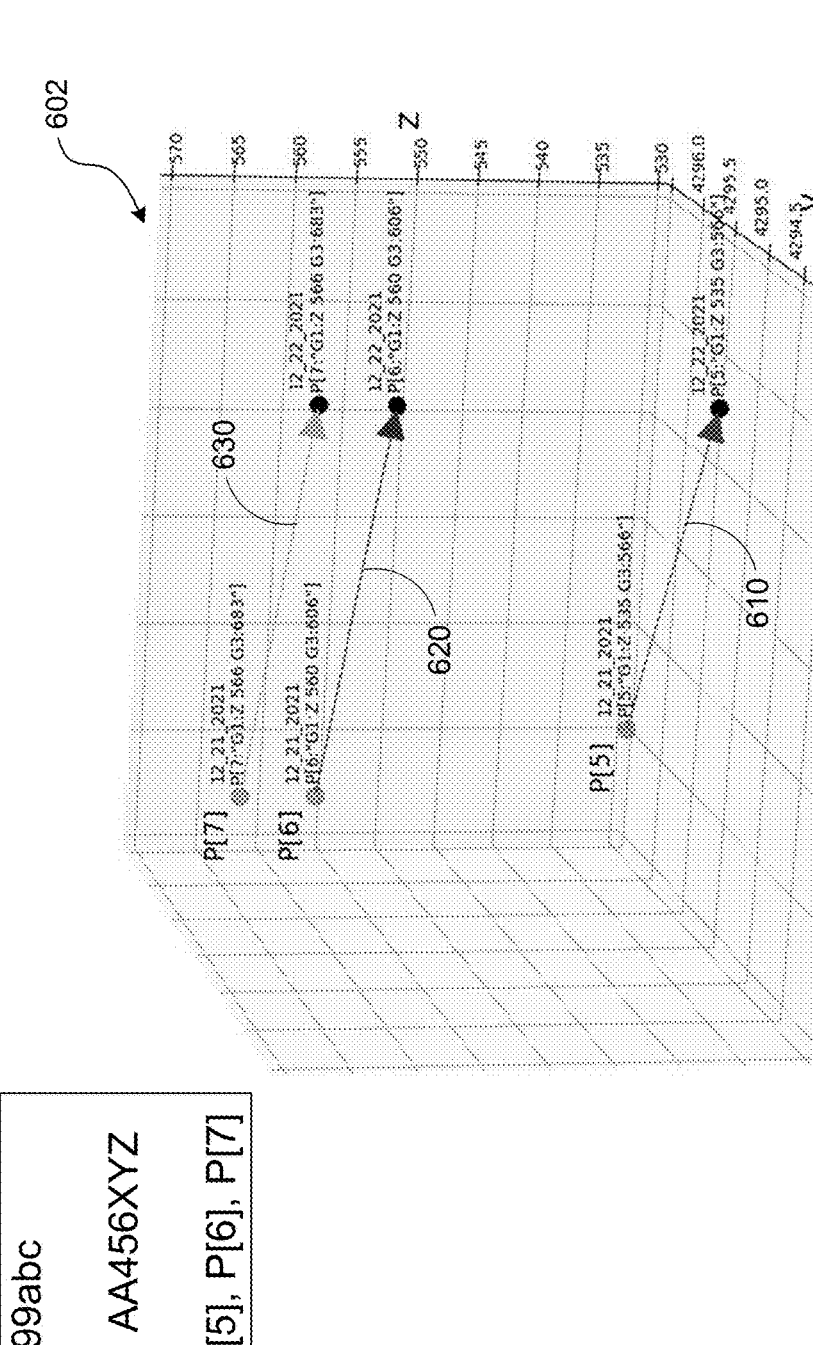
FIG. 6 is a conceptual illustration of the robot position touchup data analysis feature, where an alert is triggered by touchups performed on multiple points of a robot motion program in the same direction, according to an embodiment of the present disclosure.

FIG. 6 is a conceptual illustration 600 of the robot position touchup data analysis feature, where an alert is triggered by touchups performed on multiple points of a robot motion program in the same direction, according to an embodiment of the present disclosure. A 3D graph 602 displays three touchups; a touchup 610 made to a first point P[5], a touchup 620 made to a second point P[6], and a touchup 630 made to a third point P[7]. The points P[5], P[6] and P[7] are three points in the motion program of a particular robot; for example, they may be the locations of three spot welds being performed by the robot.

It can be seen in the graph 602 of FIG. 6 that the touchups 610, 620 and 630 are all substantially in the same direction. That is, the vectors of the touchups 610 and 620 are within a few degrees of being parallel, and likewise for the touchups 620 and 630. When multiple points in a robot's motion program need touchup in substantially the same direction, this is likely an indication that mechanical wear conditions are causing the robot to rock or tilt to one side. This is another analysis that can be used to trigger an alert. An algorithm for triggering an alert based on touchups to multiple points in the same direction may include several different calculations and criteria. For example, the minimum number of points to include in the analysis, and the maximum amount of directional difference in the touchup vectors, are configurable parameters which can be defined to suit the application.

The 3D graph 602 displayed on FIG. 6 is simply for illustration purposes. The analysis of the touchup data is performed automatically by an algorithm, as discussed above. However, the alert which is triggered by the analysis may automatically provide a graphical display of the touchup data for visualization by the operator, in the format shown in FIG. 6 (the 3D graph 602) or one of the other formats discussed earlier.

Other criteria for triggering an alert may also be defined—such as a single touchup having a distance exceeding a predefined criteria. Still other alert criteria may be defined as appropriate—involving a single point in a motion program or multiple points, and evaluating distance, direction and frequency of touchups.

Figure 7:
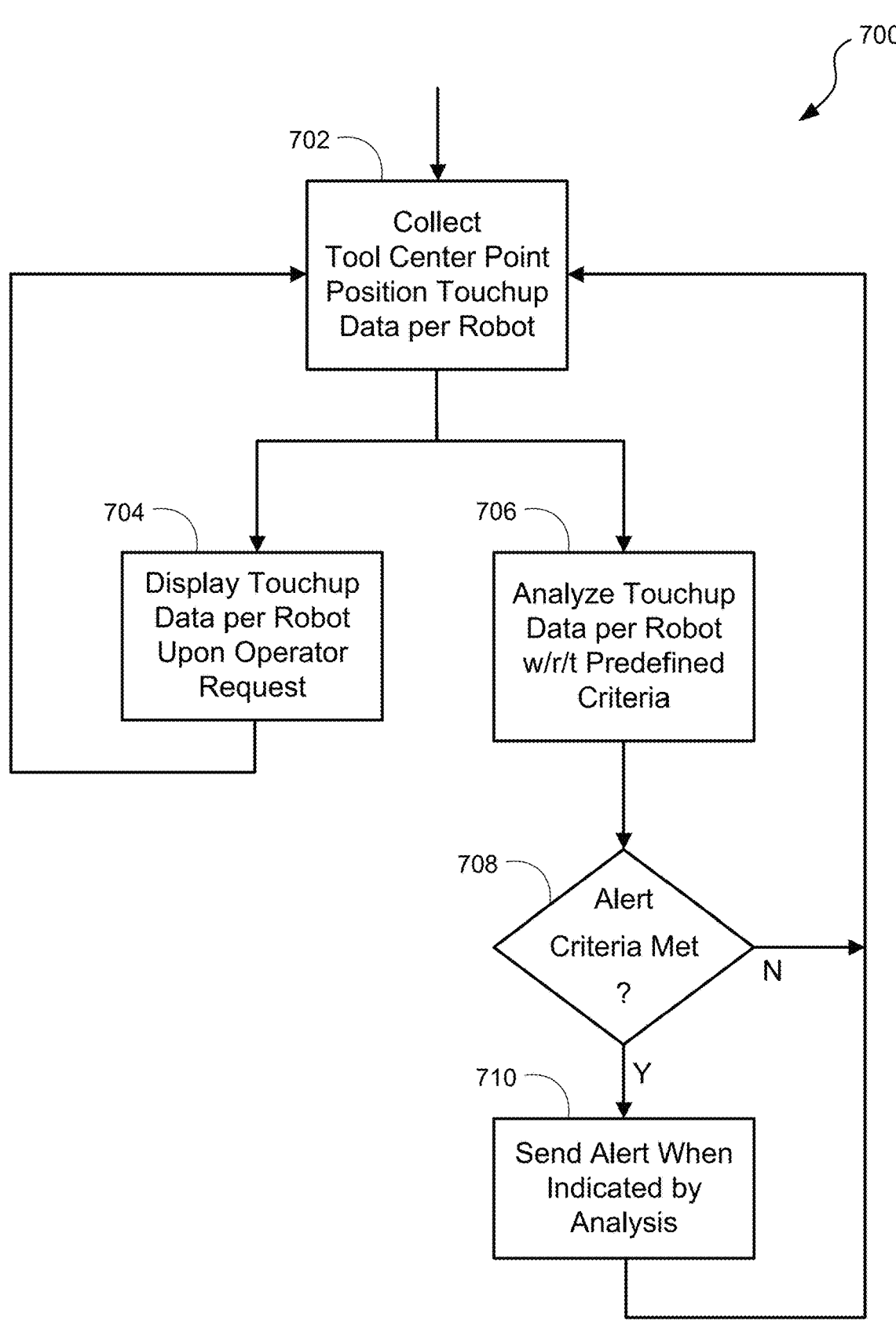
FIG. 7 is a flowchart diagram of a method for robot position touchup data visualization and analysis, according to an embodiment of the present disclosure.

FIG. 7 is a flowchart diagram 700 of a method for robot position touchup data visualization and analysis, according to an embodiment of the present disclosure. The steps of the flowchart diagram 700 are performed using the site data collection device or the cloud server 340 discussed earlier, along with a display device connected to one of the above.

At box 702, touchup data is collected for at least one robot. As discussed earlier, touchups performed on each robot and robot controller are communicated to a site data collection device which stores the touchup data for all robots at the site, and preferably also communicated to a cloud server which stores all of the touchup data for all sites in an enterprise. The touchup data includes, for each touchup, the identities of the robot and the motion program involved, the identities of one or more points which are modified in the touchup, and the magnitudes of the changes to the x/y/z positions and yaw/pitch/roll orientations of the point(s).

At box 704, touchup data is displayed upon request by a robot operator or other user. The display of touchup data was shown in FIGS. 3 and 4 and described in the corresponding discussion. The operator or other user may request display of one or more touchups for any robot at the site or with touchup data stored in the cloud server. Individual touchups to a single point, multiple touchups to the same point in a motion program, and touchups to multiple points in a motion program are examples of how the user may choose to display the touchup data.

At box 706, analysis of the touchup data is performed automatically on an ongoing basis. The touchup data analysis is performed with respect to predefined criteria, such as frequency of touchups which will trigger an alarm, and criteria for touchups to multiple points in substantially the same direction, as discussed earlier. Different criteria may be defined for different types/models of robot, for different motion programs, etc. These criteria are configurable at the site level and/or at the enterprise level, as appropriate. The touchup data analysis at the box 706 may be performed continuously in real time, or for each robot after a touchup is performed, or on a periodic basis such as every hour.

At decision diamond 708, it is determined whether any alert criteria have been met in the analysis at the box 706. When no alert criteria have been met, the process returns to the box 702 for ongoing touchup data collection. When an alert criteria is met for any robot at the decision diamond 708, the corresponding alert is sent at box 710. The alert may be an audible or visible signal at the robot controller, an email or pop-up message, a push notification, or any combination of these or other communication techniques. The purpose of the alert is to inform the appropriate person(s) that the touchup data analysis indicates that mechanical wear may have developed into looseness in at least one of the affected robot's joints, and that inspection and/or maintenance should be undertaken.

From the boxes 704 and 710, the process loops back to the box 702 where touchup data is collected each time a touchup is performed by an operator for any robot.

Throughout the preceding discussion, various computers and controllers are described and implied. It is to be understood that the software applications and modules of these computers and controllers are executed on one or more electronic computing devices having a processor and a memory module. In particular, this includes a processor in the robot controller 102 of FIG. 1, the site data collection device, and the cloud server 340 of FIG. 3 discussed above. Specifically, the processors in these devices are configured to perform the robot touchup data collection, analysis and display functions described above.

While a number of exemplary aspects and embodiments of the methods and systems for robot position touchup data visualization and analysis have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for robot position touchup data analysis, said method comprising:

collecting touchup data for a robot, where the touchup data includes one or more touchups, each touchup being an operator-defined change to a tool center point position at a point in a motion program;

displaying the touchup data, on a display device, upon request by a user;

analyzing the touchup data, on a computer having a processor and memory, using an algorithm configured to determine if alert criteria have been met, where the alert criteria are defined in terms of touchup distance, direction and frequency; and sending an alert when the alert criteria have been met, where the alert includes an indication that the robot may be experiencing mechanical wear which caused the touchup data to trigger the alert, and a description of which alert criteria were met.

2. The method according to claim 1 wherein each touchup is defined by an operator using a teach pendant to command the robot to move the tool center point to a new position which is saved and used henceforth for the point in the motion program.

3. The method according to claim 2 wherein each touchup also includes a change to a tool center point orientation at the point in the motion program.

4. The method according to claim 3 wherein each touchup changes the tool center point position and/or orientation relative to an original position and orientation of the point in the motion program, or relative to a previously-defined touchup.

5. The method according to claim 1 wherein displaying the touchup data includes displaying on a three-dimensional (3D) graph a vector depicting the change to a tool center point position for one or more touchups.

6. The method according to claim 5 wherein the 3D graph includes a textual display of position and orientation data about points at a head and tail of each vector.

7. The method according to claim 1 wherein one of the alert criteria determines whether the touchup data includes multiple touchups to a particular point in the motion program at a frequency, defined as number of touchups per amount of time, exceeding a threshold.

8. The method according to claim 1 wherein one of the alert criteria determines whether the touchup data includes multiple touchups to a particular point in the motion program in a common direction, where the common direction is defined as an angle out of parallel for the multiple touchups being below a threshold.

9. The method according to claim 1 wherein one of the alert criteria determines whether the touchup data includes touchups to multiple points in the motion program in a common direction, where the common direction is defined as an angle out of parallel for the touchups being below a threshold.

10. The method according to claim 1 wherein sending an alert includes providing an audible or visual indication on a controller of the robot, or sending an email or text message or push notification to the user or a robot operator.

11. The method according to claim 1 wherein the touchup data is collected and analyzed for a plurality of robots by a site data collection device at a same site as the robots or by a cloud server at another location, and the alert criteria are configurable for each model of robot and motion program being run.

12. A method for robot position touchup data analysis, said method comprising:

collecting touchup data for a plurality of robots, on a data collection device in communication with a controller of each of the robots, where the touchup data includes a plurality of touchups, each touchup being an operator-defined change to a tool center point position at a point in a motion program for one of the robots;

displaying the touchup data, on a display device, upon request by a user, including displaying a vector depicting one or more of the touchups on a three-dimensional (3D) graph;

analyzing the touchup data, on the data collection device, using an algorithm configured to determine if alert criteria have been met, where the alert criteria are defined in terms of touchup distance, direction and frequency of the touchups on individual robots; and sending an alert when the alert criteria have been met, where the alert lists which robot is affected and includes an indication that the affected robot may be experiencing mechanical wear which caused the touchup data to trigger the alert, and a description of which alert criteria were met.

13. The method according to claim 12 wherein one of the alert criteria determines whether the touchup data includes multiple touchups to a particular point in the motion program at a frequency, defined as number of touchups per amount of time, exceeding a threshold, and one of the alert criteria determines whether the touchup data includes touchups to one point or multiple points in the motion program in a common direction, where the common direction is defined as an angle out of parallel for the touchups being below a threshold.

14. A system for robot position touchup data analysis, said system comprising:

a plurality of robots and robot controllers; and a computer having a processor and memory and in communication with the robot controllers, said computer being configured for:

collecting touchup data for the robots, where the touchup data includes one or more touchups, each touchup being an operator-defined change to a tool center point position at a point in a motion program for one of the robots;

displaying the touchup data, on a display device, upon request by a user;

analyzing the touchup data to determine if alert criteria have been met, where the alert criteria are defined in terms of touchup distance, direction and frequency of the touchups on individual robots; and sending an alert when the alert criteria have been met, where the alert includes an indication that the affected robot may be experiencing mechanical wear which caused the touchup data to trigger the alert, and a description of which alert criteria were met.

15. The system according to claim 14 wherein each touchup is defined by an operator using a teach pendant to command one of the robots to move the tool center point to a new position which is saved and used henceforth by the one robot for the point in the motion program.

16. The system according to claim 15 wherein each touchup changes the tool center point position and/or a tool center point orientation relative to an original position and orientation of the point in the motion program, or relative to a previously-defined touchup.

17. The system according to claim 14 wherein displaying the touchup data includes displaying on a three-dimensional (3D) graph a vector depicting the change to a tool center point position for one or more touchups, and where the 3D graph includes a textual display of position and orientation data about points at a head and tail of each vector.

18. The system according to claim 14 wherein one of the alert criteria determines whether the touchup data includes multiple touchups to a particular point in the motion program for an individual robot at a frequency, defined as number of touchups per amount of time, exceeding a threshold.

19. The system according to claim 14 wherein one of the alert criteria determines whether the touchup data includes touchups to a particular point or multiple points in the motion program for an individual robot in a common direction, where the common direction is defined as an angle out of parallel for the touchups being below a threshold.

20. The system according to claim 14 wherein sending an alert includes providing an audible or visual indication on the controller of an affected robot, or sending an email or text message or push notification to the user or a robot operator.

21. The system according to claim 14 wherein the computer is a site data collection device at a same site as the plurality of robots or a cloud server at another location, and the alert criteria are configurable for each model of robot and motion program being run.

* * * * *